United States Patent
Hunt et al.

(10) Patent No.: US 10,282,612 B2
(45) Date of Patent: *May 7, 2019

(54) ENHANCED USER AUTHENTICATION

(71) Applicant: International Business Machines Corporation, Armonk, NY (US)

(72) Inventors: Hamish C. Hunt, Ashford (GB); Ashley Shea, Hursley (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/176,286

(22) Filed: Oct. 31, 2018

(65) Prior Publication Data
US 2019/0065847 A1 Feb. 28, 2019

Related U.S. Application Data

(63) Continuation of application No. 16/029,725, filed on Jul. 9, 2018, which is a continuation of application
(Continued)

(51) Int. Cl.
*G06K 9/00* (2006.01)
*G06F 17/30* (2006.01)
*G06F 21/32* (2013.01)

(52) U.S. Cl.
CPC ... *G06K 9/00617* (2013.01); *G06F 17/30256* (2013.01); *G06F 21/32* (2013.01); *G06K 9/00604* (2013.01)

(58) Field of Classification Search
CPC .............. G06F 17/30256; G06F 21/32; G06K 9/00617; G06K 9/00604
See application file for complete search history.

(56) References Cited

U.S. PATENT DOCUMENTS 6,785,406 B1    8/2004  Kamada et al.
8,092,021 B1 *  1/2012  Northcott ............. A61B 3/1015
                                                          351/206
(Continued)

OTHER PUBLICATIONS

Kavitha et al., Effect of Textured Contact Lenses on Iris Recognition, International Journal of Science Technology & Management, vol. No. 04, Special Issue No. 01, Feb. 2015, URL: http://www.ijstm.com/images/short_pdf/1422086381_336.pdf, pp. 372-380.
(Continued)

*Primary Examiner* — Kevin Ky
(74) *Attorney, Agent, or Firm* — Schmeiser, Olsen & Watts, LLP; William Hartwell

(57) ABSTRACT

A method and system for authenticating a user. An expected digital representation of an iris of at least one authentic user is a combination of a first digital representation of an iris of an eye of at least one authentic user and a second digital representation of at least one authentic overlay pattern. In response to a determination that a third digital representation of a captured image of an iris of a user to be authenticated does not match the expected digital representation: the expected digital representation is modified to alter a relative rotational alignment between the representation of the at least one authentic overlay pattern and the expected digital representation of the iris; and a further comparison between the modified expected digital representation and the third digital representation is performed. From the further comparison, an authentication signal indicative of whether authentication of the user has been successful is generated.

20 Claims, 2 Drawing Sheets

Related U.S. Application Data

No. 15/403,461, filed on Jan. 11, 2017, now Pat. No. 10,078,783.

(56) References Cited

U.S. PATENT DOCUMENTS

| | | |
|---|---|---|
| 8,818,048 B2 | 8/2014 | Du et al. |
| 9,195,890 B2 | 11/2015 | Bergen |
| 10,078,783 B2 | 9/2018 | Hunt et al. |
| 2002/0182316 A1* | 12/2002 | Gilliard ............ B29D 11/00317 351/159.62 |
| 2009/0016574 A1* | 1/2009 | Tsukahara .............. A61B 5/117 382/117 |
| 2009/0237208 A1* | 9/2009 | Tsukahara .......... G06K 9/00604 340/5.82 |
| 2010/0046808 A1 | 2/2010 | Connell et al. |
| 2010/0110374 A1* | 5/2010 | Raguin ................ G06K 9/0061 351/206 |
| 2013/0089240 A1 | 4/2013 | Northcott et al. |
| 2014/0193045 A1* | 7/2014 | Otis .................. G06K 9/00597 382/117 |
| 2016/0171323 A1* | 6/2016 | Gadde ................ G06K 9/00899 382/117 |
| 2016/0335474 A1* | 11/2016 | Santos-Villalobos ........................ G06K 9/0061 |
| 2017/0228594 A1* | 8/2017 | Takemoto ............ G06K 9/0061 |
| 2018/0197005 A1 | 7/2018 | Hunt et al. |

OTHER PUBLICATIONS

Doyle et al., Robust Detection of Textured Contact Lenses in Iris Recognition Using BSIF, URL:https://pdfs.semanticscholar.org/c553/184ae40cd6a9456c355d4046fe2b7246d225.pdf, 2015 IEEE, 14 pages.

Yadav et al., Unraveling the Effect of Textured Contact Lenses on Iris Recognition, IEEE Transactions on Information Forensics and Security, vol. 9, No. 5, May 2014, pp. 851-862.

John Mark Jackson, Back to Basics: Soft Lenses for Astigmatism, http://www.clspectrum.com/printarticle.aspx?articleID=107074, Contact Lens Spectrum, Jun. 1, 2012, 4 pages.

Notice of Allowance (Oct. 1, 2018) for U.S. Appl. No. 16/029,725, filed Jul. 9, 2018.

Notice of Allowance (May 17, 2018) for U.S. Appl. No. 15/403,461, filed Jan. 11, 2017.

\* cited by examiner

ENHANCED USER AUTHENTICATION

This application is a continuation application claiming priority to Ser. No. 16/029,725, filed Jul. 9, 2018, which is a continuation of Ser. No. 15/403,461, filed Jan. 11, 2017, U.S. Pat. No. 10,078,783, issued on Sep. 18, 2018.

TECHNICAL FIELD

The present invention relates generally to authenticating a user and to a user authentication package, and more particularly to authentication of a user based on iris recognition.

BACKGROUND

Iris recognition is a known method of biometric identification in which image data associated with the iris of one or both of the eyes of a user is utilized in authenticating the identity of a user. In some cases, mathematical pattern recognition techniques are applied to the iris images.

It is furthermore known that the intrinsic patterning in some contact lenses can interfere with known iris recognition techniques.

SUMMARY

The present invention provides a method, and associated computer program product and computer system, for authenticating a user. A first digital representation of an iris of an eye of at least one authentic user is obtained. A second digital representation of at least one authentic overlay pattern is obtained. A third digital representation of a captured image of an iris of a user to be authenticated is obtained, where the iris of the user has been overlaid with a contact lens including a further overlay pattern thereby creating an image, in the third digital representation, comprising the iris of the user to be authenticated and the further overlay pattern. An expected digital representation of an iris of at least one authentic user is generated, by combining the first digital representation with the second digital representation. An attempt is made to authenticate the user by comparing the third digital representation with the expected digital representation. Based on the comparing, an authentication signal is generated. The authentication signal is indicative of whether authentication of the user has been successful.

BRIEF DESCRIPTION OF THE DRAWINGS

Embodiments of the present invention will now be described, by way of example only, with reference to the following drawings.

DETAILED DESCRIPTION

Figure 1:
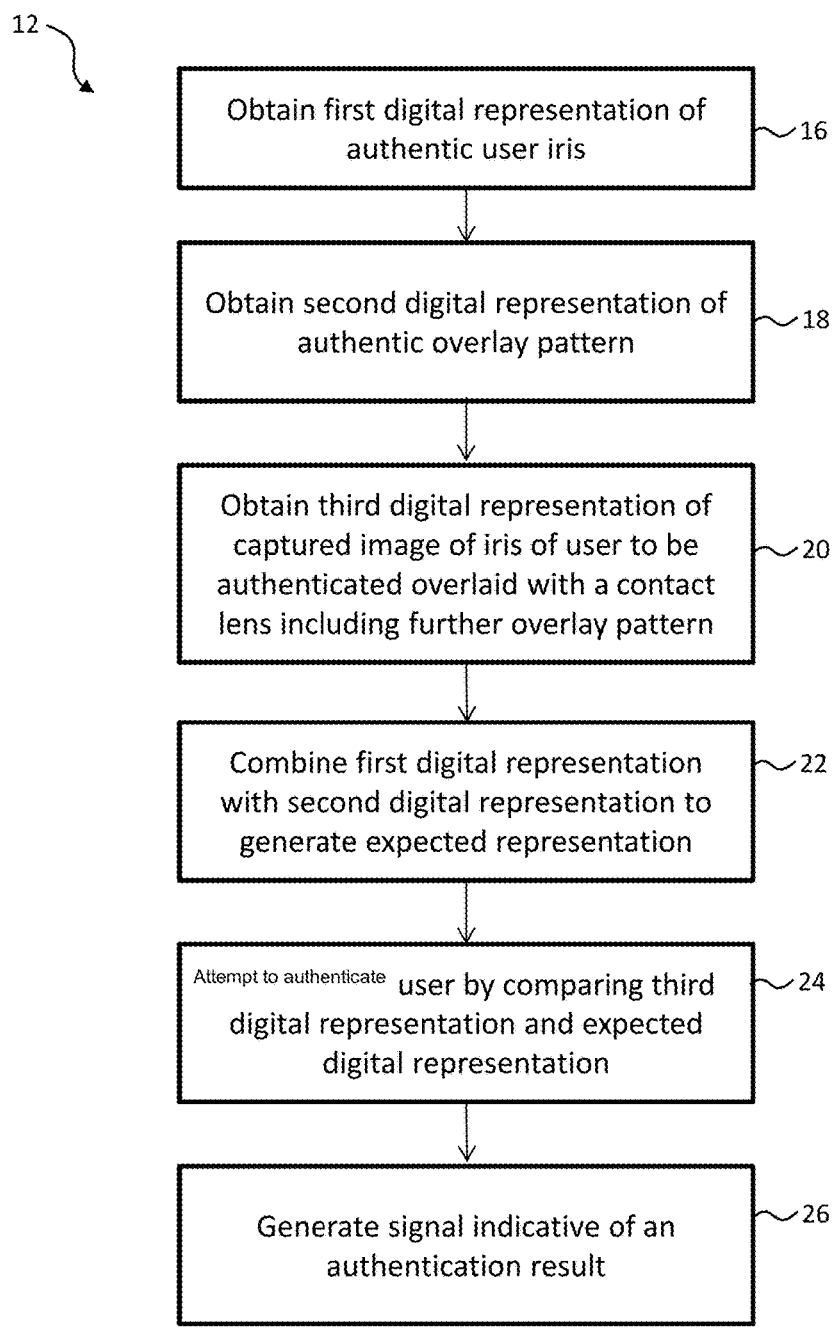
FIG. 1 is a flow diagram representing a method for authenticating a user, in accordance with embodiments of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program; e.g., various parts of one or more algorithms.

Embodiments of the present invention provide a method for authenticating a user based on recognition of the user's iris after modification of the iris's appearance by application of a contact lens including an overlay pattern. It is known that the patterning embodied in some varieties of contact lens can interfere with the recognition processes of known iris recognition techniques. In particular, patterning in a lens typically distorts or disrupts the appearance of the patterning of the iris itself, which can lead to the iris recognition system returning false negative results in authentication procedures.

Embodiments of the present invention exploit this disruptive effect in order to provide a modified form of iris recognition in which authentication is achieved through the scanning or capturing of user irises whose visible patterning has been deliberately altered by the application of contact lenses comprising overlay patterns. In authenticating a user, a representation of the thus modified iris patterning is checked against a constructed representation of the expected visible patterning, based on known authentic user iris patterning and known authentic overlay pattern(s).

Embodiments of the invention provide the added technical effect of improved robustness of the authentication procedure, because the authentication procedure according to embodiments of the present invention effectively introduces a second layer to the verification process, wherein not only is the intrinsic patterning of the user's iris taken into account in authenticating the user, but also the patterning of a secondary overlay pattern is taken into account in authenticating the user.

Only if the captured representation of the modified user's iris matches an expected modified representation, incorporating patterning of both the known authentic iris and known authentic overlay pattern, will authentication be confirmed for the user to be authenticated, which effectively requires a matching of both of the iris and the overlay pattern of the modified iris in order for the user to be accepted as authentic.

The overlay patterns which are considered valid in implementation of the authentication process may be changed as frequently as desired. These overlay patterns therefore represent a truly independent secondary layer to the authentication process. The integrity of the authentication procedure can be upheld even in the event that the patterning of an authentic user's iris were somehow replicated. Replicated iris patterning would not be sufficient according to embodiments of the present invention to circumvent the authentication procedure. Any attempted defrauder would be required also to replicate the patterning of an authentic overlay pattern and combine it with the duplicated iris patterning. However, since the authentic overlay patterns can be changed arbitrarily, the task of generating a combined image which includes up-to-date authentic overlay pattern may be rendered extremely challenging.

FIG. 1 is a flow diagram representing a method for authenticating a user, in accordance with embodiments of the invention. The method 12, in step 16, comprises obtaining a first digital representation of an iris of an eye of at least one authentic user. In examples, the digital representation may be a digitally stored visual representation, such as a digital image. In other examples the digital representation may be a different form of representation, such as a set of data representing or characterizing certain structural or graphical features of the genuine user iris. The digital representation may comprise data representing characteristics of the patterning of the iris.

Further to obtaining the first digital representation, the method comprises, in step 18, obtaining a second digital representation of at least one authentic overlay pattern. As with the first representation, the second digital representation may be a visual representation, or may be a different form of representation, such as data representing structural or graphical characteristics of the at least one authentic overlay pattern.

The at least one authentic overlay pattern may be any pattern suitable for overlaying atop a representation of an iris of an eye without fully obstructing view of the patterning of the iris beneath. The authentic overlay pattern may consist exclusively of the set of graphical marks, figures or characters which characterize the pattern, with spaces between these marks being transparent. The authentic pattern may be constructed of lines or figures or characters or other graphical marks for example. The pattern may typically be bounded so as to form an annular shape; for example, an annular shape having dimensions that match the minimal dimensions of a typical human eye when the pupil is fully dilated.

Both the first digital representation and the second digital representation may in examples be obtained by retrieving the digital representations from a data store. The first and second digital representations may in such examples be retrieved from separate data stores, or from the same data store.

In examples, obtaining the first digital representation in step 16 may comprise retrieving the first digital representation from a data store storing digital representations of a plurality of different genuine user irises. Obtaining the second digital representation in step 18 may comprise retrieving the second digital representation from the same or a different data store, storing digital representations of a plurality of different authentic overlay patterns. At least a subset of the authentic overlay patterns stored in the data store may be changed on a periodic basis.

Further to obtaining the first and second digital representations, the method comprises, in step 20, obtaining a third digital representation of a captured image of an iris of a user to be authenticated, where the iris of the user has been overlaid with a contact lens including a further overlay pattern thereby creating an image composed of the iris of the user to be authenticated and the further overlay pattern.

The further overlay pattern may be comprised by or incorporated in the lens in such a way that the pattern itself does not interfere with the sight of the wearer of the lens, but, when viewed from a direction facing toward a wearer, the pattern is visible, along with the iris of the wearer. The pattern may appear as superposed atop the wearer's iris.

The further overlay pattern may be any suitable pattern, constructed of lines or figures or characters or other graphical marks for example. The pattern may typically be bounded so as to form an annular shape, for example an annular shape having dimensions that match the minimal dimensions of a typical human eye when fully dilated, so that vision of the wearer of the contact lens is not impaired by the presence of the pattern.

The third digital representation may be obtained from an image capture device which may be a camera or in further examples may be any suitable device comprising a light sensitive element sufficient for capturing a representation of an image of the iris of the user's eye. The image capture device may in examples comprise a pattern scanning device, configured to scan the patterning of the iris being overlaid with the further overlay pattern and output some form of (digital) representation of the presented image of the overlaid iris and overlay pattern. This representation may be data representative or indicative of structural or graphical properties of the patterning. This data may be sufficient for example to reconstruct the patterning, based on a known decoding protocol or key.

Further to obtaining the first, second and third digital representations, the method comprises, in step 22, generating an expected digital representation of an iris of an authentic user having been overlaid with the authentic overlay pattern by combining the first digital representation (of an authentic user iris) with the second digital representation (of an authentic overlay pattern). The combining of the digital representations may include processing the representations so as to superpose the second digital representation atop the first digital representation. Image processing algorithms suitable for performing such a superposition will be immediately apparent to the skilled person.

Following construction of the expected digital representation, the method 12 comprises, in an authentication step 24, which attempts to authenticate the user to be authenticated by comparing the third digital representation with the expected digital representation. In examples, based on the comparison, it may be determined whether a match exists between the two (i.e., the third digital representation and the expected digital representation). If the two do match, authentication of the user may be confirmed. If the two are determined not to match, authentication may be rejected or denied. However, in alternative examples (to be described below), in the event that there is no match between the two digital representations, further comparison or authentication processes may follow, for example to compensate any potential orientational misalignment of the contact lens overlay pattern compared with the obtained authentic overlay pattern.

Comparing the expected digital representation with the third digital representation may be performed using any suitable comparison algorithm or procedure. Suitable procedures for comparing, for example, image data or graphical representations are well known in the art and would be immediately apparent to the skilled person in the present field.

Following the authentication step 24, the method 12 finally comprises, in step 26, generating an authentication signal indicative of whether authentication of the user has been successful. The authentication signal may take the form of a data signal, such as a data message. The authentication signal may additionally or alternatively comprise a sensory output, such as for instance a visual message or other graphical output presented on a display or monitor. It may comprise an acoustic output in examples.

In accordance with one or more examples, the authentication signal may comprise a signal or data message for communication to an associated mechanical device such as a locking mechanism. Receipt of the authentication signal by the locking mechanism may trigger activation or release of the locking mechanism, to thereby provide secure access to an area or space.

In further examples, the authentication signal may be used to determine whether access is granted to a secure server. In these examples, the image capture device by means of which the third digital representation is obtained may be a webcam operatively coupled to a local client computer. The third digital representation may be captured by the local webcam and communicated to the remote server. The remote server may furthermore obtain the first and second digital representations and perform the authentication in order to determine whether the user to be authenticated is authentic. Based on the authentication result, the remote server may either grant the local client computer access to the server or deny access. A positive authentication result may trigger the remote server to grant secure access to the client computer or computer system. A signal indicative of a negative authentication result may lead the server to deny access to the client computer or computer system.

As noted above, the first representation and second representation may be obtained from one or more data stores storing digital representations of a plurality of authentic user irises and a plurality of authentic overlay patterns, respectively.

According to one set of examples, the method 12 may comprise constructing a plurality of expected representations, each representing a different combination of one of the authentic user irises and one of the authentic overlay patterns. The authenticating step 24 may comprise comparing the third representation of the captured image with each of these constructed representations in turn for instance. In this way, the captured image of the modified iris of the user to be authenticated may be checked against each of the known authentic users and known authentic overlay patterns (until a match is found).

The expected representations may in examples be constructed piecemeal, with each new representation only being constructed following an instance of unsuccessful authentication in step 24. The method 12 in these examples may comprise a loop, wherein after any unsuccessful authentication in step 24, the method may return to step 16 or step 18, so that a new expected representation is constructed using a different overlay pattern and/or authentic user iris and compared with the third representation.

In particular examples, the method may be configured such that the user to be authenticated is authenticated with respect to the stored iris representation of a specific one authentic user only, which may be achieved in embodiments by obtaining further information indicating a particular one authentic user against which the user to be authenticated is to be checked. This further information might be obtained through a further user interface device. The user interface device may be configured to scan a user identification card; for instance, the card containing identification data providing an indication of a particular one authentic user.

In accordance with such examples, a plurality of expected representations may be constructed, each expected representation comprising a digital representation of the same authentic user iris, but formed of different authentic overlay patterns, which would significantly reduce the computational demands of the comparison process. The particular authentic user iris to be used in constructing these expected representations may be determined based on the obtained further user information described above.

In particular examples, there may be stored in the data store a unique subset of one or more authentic overlay patterns associated with or assigned to each specific authentic user. In these examples, a plurality of expected representations may be constructed, each expected representation composed of the same authentic user iris representation, and each expected representation comprising a different one of the particular subset of authentic overlay patterns associated with this one authentic user. The one authentic user for which the expected representations are constructed may be determined based on obtaining further information indicating the authentic user, as described above. The subset of authentic overlay pattern representations associated with each authentic user may typically be smaller than the full set of representations. Construction of the plurality of expected representations may therefore be rendered less computationally demanding.

According to a particular set of examples, there may be constructed in step 22 only a single expected digital representation. The method may in this case further comprise obtaining additional information indicative of the particular overlay pattern and the particular authentic user iris on the basis of which the expected representation is to be generated. These expected representations may then be retrieved from a data store storing a plurality of such representations, based on the obtained further information.

In the above examples, the information identifying the particular authentic user may, for instance, be obtained from a user interface device, such as a user ID card scanner, wherein scanning of a user ID card provides information sufficient to identify a particular one user of the authentic users. The information identifying the particular overlay pattern may in examples similarly be obtained by means of a user interface device.

In particular examples, each contact lens may be conveyed or distributed to the user to be authenticated in combination with an associated unique code. Each authentic overlay pattern stored in the data store may be associated in the data store with this unique code. A user may input the code using the interface device as part of the authentication procedure, whereupon the particular pattern associated with the code in the data store may be retrieved in step 18 of the method 12. By including these further processes for obtaining information identifying a particular one authentic user and particular one authentic overlay pattern, the requirement to construct multiple expected representations is avoided. The computational resource required to perform the authentication method 12 is thereby significantly reduced.

Additionally or alternatively, in various embodiments, each authentic user may be linked or associated in the first data store with a unique overlay pattern. In these embodiments, each representation of an authentic user iris stored in the first data store may include a reference to a particular one of the authentic overlay pattern representations stored in the second data store. Upon obtaining, in step 16, the first digital representation from the first data store, the particular referenced authentic overlay pattern is then obtained in step 18 from the second data store. Such an embodiment enhances the robustness of the authentication procedure, since authentication will in each case only be successful if the captured image includes the correct unique combination of authentic user iris representation and authentic overlay pattern representation.

In accordance with one or more embodiments, the method 12 may further comprise obtaining further biometric and/or authentication information regarding the user to be authenticated, and using this further biometric and/or authentication information in combination with the obtained digital representations to authenticate the user. The further information may include for example a representation of the user's fingerprint, or may simply include information obtained from an identification card scanner, where the user is required to scan a personal identification card comprising encoded authorization data. The card might comprise a QR code or other barcode in which the authorization data is encoded, or may comprise an RFID chip within which the authorization data is securely encoded. By requiring further authentication data to be provided, the robustness of the authentication method is further enhanced.

In accordance with one or more embodiments, the authentication method 12 may comprise further processes directed to compensating for any orientational misalignment between the further overlay pattern of the contact lens (as it appears in the third representation of the captured image of the user's modified iris), and the at least one authentic overlay pattern in the expected representation. If the user to be authenticated places the contact lens into the user's eye at a different orientation than was intended, the image of the modified iris patterning may not provide an acceptable match with the expected representation, which has been constructed using the authentic overlay pattern arranged at its intended orientation, which may lead as a result to a false negative result in the authentication 24.

To resolve this potential problem due to orientational misalignment, in one or more embodiments of the invention, the authentication step 24 of the user may comprise performing an initial comparison of the third digital representation with the expected digital representation, and, in the case that the two (i.e., the third digital representation and the expected digital representation) are determined not to match, the following steps are performed: modifying the expected digital representation to alter a relative rotational alignment between the representation of the at least one authentic overlay pattern and the representation of the at least one authentic user iris which compose the expected representation, and performing a further comparison between the thus modified expected digital representation and the third digital representation.

In accordance with one or more examples of the above approach, the initial comparison may comprise determining a degree of correspondence between the expected digital representation and the third digital representation, which may comprise determining whether a degree of correspondence between the expected digital representation and the third digital representation has increased.

Such an approach provides a means for determining whether there is a (likely) match between the third digital representation and the expected digital representation, without the need for the two representations to exactly correspond with one another in terms of the rotational alignment of the overlay pattern. By adjusting the relative rotational alignment between the second digital representation and the first digital representation by a (potentially arbitrary) fixed amount, and then determining whether a degree of correspondence has improved (i.e. increased), it may be concluded with relatively high probability whether there does exist, at some rotational state, an alignment for which the third and expected representations do exactly match (without this state actually being identified).

In one or more examples, in the case that a degree of correspondence is found not to have increased, the process may be repeated a further time, which may in examples include adjusting the relative rotational alignment by a smaller amount, and/or may include adjusting the relative rotational alignment in a different direction.

The efficiency of the rotational adjustment process may be improved in the case that the at least one authentic overlay pattern of the second digital representation is a periodic pattern. In the case for example that the authentic overlay pattern repeats every 36 degrees, the likelihood of a rotational alignment between the second and first digital representations matching is increased by a factor of 10. Furthermore, in the case that the third and expected digital representations are determined not to match, only a small rotational adjustment would be necessary; for instance of 18 degrees, or 9 degrees, in order to provide a suitable modified representation for re-testing.

In accordance with one or more embodiments, a modified version of the above approach may be implemented. In these embodiments, modifying the expected digital representation comprises determining a cross-correlation function between the third digital representation and the second digital representation, identifying one or more maxima of the cross-correlation function, and altering the relative rotational alignment between the first and second digital representations by an amount dependent upon the positions of these maxima within the second and/or third digital representations.

Performing a cross-correlation between the third digital representation and the second digital representation (the authentic overlay pattern) may typically be faster and less computationally demanding than performing a comparison between a modified expected digital representation (as described above) and the third digital representation. In particular, in the case that the authentic overlay pattern represented by the second digital representation is fully transparent between the graphical lines and marks of the pattern, the pattern is informationally relative sparse (in comparison with a full expected digital representation). Transparent regions may be represented as zeros in performing the function for example. Cross-correlation between the second digital representation and the third digital representation may therefore be faster, and the results also clearer, than a further full comparison between the modified expected digital representation and the third digital representation.

Upon performing the cross-correlation function, it is possible to identify the locations of the maxima. From the locations of these maxima, the necessary rotation required (between the second and first digital representations) to produce a matching expected digital representation may readily and straightforwardly be determined.

The correlation function may in examples be efficiently calculated using a Fast Fourier Transform (FFT). The Fast Fourier Transform allows image data to be transformed into the frequency domain, whereupon calculation of cross-correlation is rendered simpler. An assumption is made for this approach that the non-transparent portions of the further overlay pattern in the contact lens register have a higher relative amplitude in the third digital representation than the patterning of the user's iris. However, this assumption is reasonable, given the relative positioning of the two layers, with the overlay pattern placed on top of the user's iris.

Suitable cross-correlation functions for performing the above described rotational comparison and adjustment process would be well known to the skilled person and will therefore not be described in further detail.

In particular examples, the third digital representation may comprise three-dimensional image data. However, for optimization of the procedure, two-dimensional image data may be used.

Additionally or alternatively, the potential difficulty of overlay pattern orientation may be resolved in the structure of the contact lenses themselves. The contact lenses may be constructed with a prism-ballast design for instance. In a prism-ballast design, the lens is formed having a thickness differential between the top and the bottom, such that a thin upper edge orients under the upper lid and a thicker, lower portion is squeezed out from under the upper lid. In this way, consistent orientation of the incorporated overlay pattern may be ensured.

Additionally or alternatively, in accordance with one or more embodiments, there may be provided on (for example, an edge of) each contact lens a graphical marker, from which an orientation of the lens (and therefore of the overlay pattern included in the lens) may be determined. The graphical marker may be located around the edge of the lens at a known angular position relative to the overlay pattern when correctly oriented for example. Upon obtaining the third digital representation (in step 20), the angular position of the marker may be identified and, based upon this identification of the angular position of the marker, the orientation of the second digital representation in the constructed expected digital representation may be adjusted so as to substantially cohere with that of the overlay pattern in the captured image.

In further examples, the graphical marker may be located within a more central region of the contact lens, such that the marker overlaps with the further overlay pattern and/or the patterning of the user's iris, which would ensure that the marker were automatically included in the captured image forming the third digital representation.

In accordance with one or more embodiments, the at least one authentic overlay pattern may be changed on a periodic basis, for example hourly, daily, weekly, monthly or at any other time interval. In the case that a plurality of authentic overlay patterns are stored in a data store (as described above), all or a subset of the plurality of overlay patterns may in examples be changed on a periodic basis. In examples, changing of one or more of the authentic overlay patterns may be accompanied by a triggering or commissioning of manufacture of a set of one or more new contact lenses, the new contact lenses incorporating the new (changed) authentic overlay pattern. By regularly changing the authentic overlay patterns, the security of the authentication method may be enhanced. For example, the overlay pattern comprised in any lost or stolen contact lens would only remain valid with regards to authentication for a limited period, thereby limiting the security implications of such compromised hardware. The potential implications of any duplicated authentic overlay pattern is also in this case reduced since the available time span for using the duplicated overlay pattern would be limited.

In accordance with one or more embodiments, the method 12 may further comprise conveying a contact lens comprising an authentic overlay pattern to the user to be authenticated by a secure distribution means. Secure distribution means may for example include conveyance of the contact lens in a secure package; for instance, a package having a breakable seal such that any compromise of the package could be identified and the corresponding overlay pattern of the contained lens could be deleted as an authentic overlay pattern. The secure distribution means might additionally or alternatively include a secure means of transportation; for example, a secured courier utilizing secure delivery vehicles.

Figure 2:
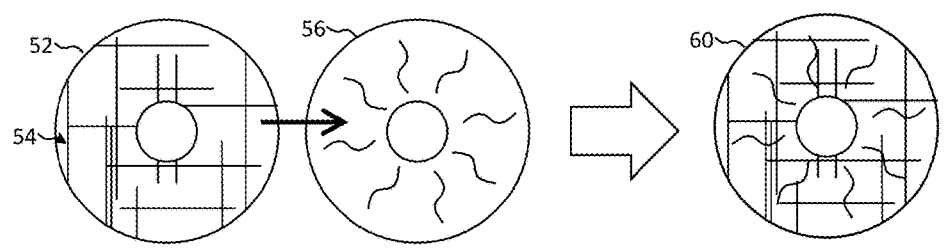
FIG. 2 schematically depicts an example contact lens, in accordance with embodiments of the present invention.

FIG. 2 schematically depicts an example contact lens 52, in accordance with embodiments of the present invention. An example overlay pattern 54 is applied to an iris 56 of a user's eye and the thus generated combined pattern 60 is composed of the user's iris overlaid with the overlay pattern. The example contact lens 52 shown in FIG. 2 is composed, by way of example, of a plurality of arbitrarily distributed vertical and horizontal lines. All spaces between the lines are transparent such that upon application of the lens to the user's eye, the patterning of the iris 56 beneath may still be seen. The overlay pattern in this example is bounded to form an annular shape. In this way, upon application to the user's eye, the vision of the user (through the pupil) is not impeded.

Although the particular overlay pattern 54 illustrated in FIG. 2 is comprised exclusively of horizontal and vertical lines, this pattern is presented merely by way of illustration of the concept and by no means limits the scope of possible patterns which may be utilized in alternative examples.

As shown, upon placement of the overlay pattern over the iris, combined pattern 60 is generated, composed of the superposition of the two patterns. The patterning of the user's iris 56 is visible through the transparent portions of the contact lens 52, with only the lines of the pattern 54 itself impeding or obstructing the iris patterning.

Embodiments in accordance with an aspect of the invention further provide a computer program product for authenticating a user, the computer program product comprising a computer readable hardware storage medium or device having program instructions stored therein, the program instructions executable by a processor to cause the processor to perform the processes of any of the authentication methods described above.

Embodiments in accordance with a further aspect of the invention also provide a computer system for authenticating a user. An example computer system 30 in accordance with one or more embodiments is schematically illustrated in FIG. 3.

Figure 3:
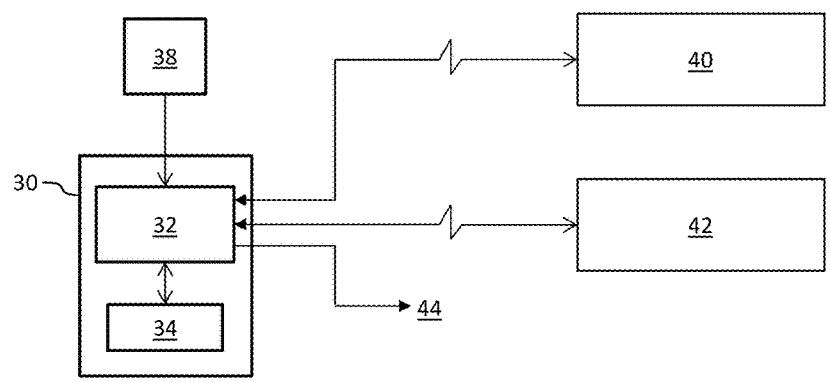
FIG. 3 is a block diagram schematically depicting the architecture of a user-authentication system, in accordance with embodiments of the present invention.

FIG. 3 is a block diagram schematically depicting the architecture of a user-authentication system, in accordance with embodiments of the present invention. The computer system 30 in FIG. 3 comprises a processor 32 and a hardware computer readable storage medium or device 34 having program instructions embodied therewith, the program instructions executable by the processor to cause the processor to perform the processes of any of the example authentication methods described above.

The processor 32 is a hardware device for executing software that can be stored in the computer readable hardware storage medium or device 34. The processor 32 may be virtually any custom made or commercially available processor, a central processing unit (CPU), a digital signal processor (DSP), or an auxiliary processor among several processors associated with the computer system 30, and the processor 32 may be a semiconductor based microprocessor (in the form of a microchip) or a microprocessor. The processor may be a dedicated processor, having processing architecture comprised locally in a single device, or may be a shared processor, having a processing architecture which is distributed across several devices.

The computer hardware readable storage medium or device may be any suitable hardware data storage medium. The hardware storage medium or device may be integral to the computer system 30 or may be accessible to the system over any suitable data communication pathway, such as a local or remote area network connection or an Internet connection for instance. The hardware storage medium or device may include or consist of a cloud-based hardware storage medium or device or a network server store, accessible by a suitable data communication pathway. Examples of suitable hardware data storage media and devices will be described in greater detail below.

In accordance with the example of FIG. 3, the computer system is operatively coupled (e.g. by means of any suitable data communication link, such as USB or other serial connection, or by means of a local or wide area network) with an associated image capture device 38 configured for capturing an image of an iris of a user being overlaid with a contact lens including a further overlay pattern. In examples, the processor 32 may be configured to obtain the third digital representation by controlling the image capture device 38 to capture an image of a user's iris being overlaid with an overlay pattern. A digital representation of the captured image is then communicated from the image capture device 38 to the processor, thereby providing the processor with the third digital representation. The digital representation may take the form of a digital image. Alternatively, the digital representation may comprise a different form of representation, for instance comprising data representing structural or graphical characteristics of the captured image.

In particular examples, the image capture device may be a camera or may comprise a camera. In further examples, the image capture device may be any form of device comprising one or more light sensitive components suitable for capturing at least a representation of an image of a user's iris being overlaid with an overlay pattern.

In accordance with one or more examples, the image capture device 38 may be comprised by the computer system 30.

As shown in FIG. 3, in accordance with the present example, the processor 32 is adapted to obtain the first representation (of an authentic user's iris) from a first remote data store 40, the first data store comprising a plurality of digital representations of authentic user irises. The processor 32 is further configured to obtain the second digital representation (of an authentic overlay pattern) from a second remote data store 42, the second remote data store storing a plurality of representations of authentic overlay patterns.

In further examples, the first 40 and second 42 remote data stores may be replaced by a single remote data store, the single remote data store comprising a plurality of digital representations of authentic irises and a plurality of digital representations of authentic overlay patterns. Additionally or alternatively, the first and/or second (or single combined) data stores may be comprised by the computer system 30, so as to provide local data stores within which the digital representations are stored. In this case, obtaining the first digital representation and/or the second digital representation may comprise retrieving said representations from the respective locally embodied data store(s).

The first 40 and second 42 data stores may be, or may comprise, any suitable form of hardware data storage medium or device for storing the plurality of digital representations as described above. The data stores may include one or more databases for storing the plural digital representations, each database being assigned a unique record within the database for example. Examples of suitable hardware data storage media and devices are described in greater detail below, with reference to the computer system 30. However, these data storage media and devices are to be understood as being equally applicable for the provision of the first and second data stores.

Upon obtaining a first digital representation from the first data store 40, a second digital representation from the second data store 42, and a third digital representation from the image capture device 38, the processor 32 of the computer system 30 is configured to generate an expected digital representation by combining the first and second digital representations. The processor is further configured to compare this expected digital representation with the obtained third digital representation, and, based upon this comparison, to determine an authentication result. In particular, if there is a match between the expected digital representation and the third digital representation, the processor may be configured to determine a positive result for authentication, and if there is no match the processor may be configured to determine a negative result for the authentication. Following determination of authentication outcome, the processor is configured to generate an authentication signal 44 indicative of the results of the authentication.

As discussed above, the authentication signal may be a data message, for instance for relaying to a further user interface unit such as a display or other sensory output device, or for relaying to a further remote computer system for example.

Embodiments in accordance with a further aspect of the invention also provide a user authentication package. The package comprises a contact lens for each user to be authenticated, each lens including a further overlay pattern, the pattern being such that upon placement of the lens over an iris of the respective user's eye, an image is created composed of the iris of the user to be authenticated and the further overlay pattern. The package further comprises a computer program product in accordance with any of the computer program product embodiments described above. In particular, the computer program product comprises a computer readable storage medium having program instructions embodied therewith, the program instructions executable by the processor to cause the processor to perform any of the example authentication methods described above.

Contact lenses having embodied graphics or color dyes are well known in the art and means for producing a contact lens having a further overlay pattern in accordance with embodiments of the authentication package will be immediately apparent to the skilled person. Examples for providing the overlay pattern in or on the lens include for example printing the pattern onto the lens or onto a layer within the body of the lens.

The contact lens may in examples take the form of the example contact lens 52 illustrated in FIG. 2, wherein the overlay pattern is bounded in an annular shape, thereby leaving a transparent circular annulus at the center of the lens, said annulus at the center of the lens for example having dimensions substantially matching the maximal outer dimensions of a typical human pupil when fully dilated. In this way the vision of the user is not impaired when the contact lens is placed on the eye.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises a computer readable hardware storage device having computer readable program code stored therein, said program code containing instructions executable by a processor of a computer system to implement the methods of the present invention.

A computer system of the present invention comprises a processor, a memory, and a computer readable hardware storage device, said storage device containing program code executable by the processor via the memory to implement the methods of the present invention The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for authenticating a user, said method comprising:
   attempting to authenticate the user by comparing a third digital representation of a captured image of an iris of a user to be authenticated with an expected digital representation of the iris, wherein the expected digital representation of the iris is a combination of a first digital representation of an iris of an eye of at least one authentic user and a second digital representation of at least one authentic overlay pattern, where the iris of the user has been overlaid with a contact lens including a further overlay pattern thereby creating an image, in the third digital representation, comprising the iris of the user to be authenticated and the further overlay pattern, and wherein said attempting to authenticate the user comprises performing an initial comparison of the third digital representation with the expected digital representation;

in response to a determination, from said initial comparison, that the third digital representation and the expected digital representation do not match:
 modifying the expected digital representation to alter a relative rotational alignment between the representation of the at least one authentic overlay pattern and the expected digital representation of the iris of the at least one authentic user; and
 performing a further comparison between the modified expected digital representation and the third digital representation; and
 generating, based on the further comparison, an authentication signal indicative of whether authentication of the user has been successful.

2. The method of claim 1, wherein the first digital representation and the second digital representation are obtained by retrieving the first and second digital representations from a data store.

3. The method of claim 1, said method comprising:
 changing the at least one authentic overlay pattern on a periodic basis.

4. The method of claim 1, wherein the third digital representation is obtained from an image capture device configured to capture the image of an iris of the user to be authenticated being overlaid with the further overlay pattern.

5. The method of claim 4, wherein said obtaining the third digital representation comprises controlling the image capture device to capture the image of an iris of the user to be authenticated being overlaid with the further overlay pattern.

6. The method of claim 1, wherein said modifying the expected digital representation comprises:
 determining a cross-correlation function between the third digital representation and the second digital representation;
 identifying one or more maxima of the cross-correlation function; and
 altering the relative rotational alignment by an amount dependent upon the positions of the one or more maxima within the second and/or third digital representations.

7. The method of claim 1, said method further comprising:
 conveying the contact lens to the user to be authenticated by a secure distribution means.

8. A computer program product, comprising a computer readable hardware storage device having computer readable program code stored therein, said program code containing instructions executable by a processor of a computer system to implement a method for authenticating a user, said method comprising:
 attempting to authenticate the user by comparing a third digital representation of a captured image of an iris of a user to be authenticated with an expected digital representation of the iris, wherein the expected digital representation of the iris is a combination of a first digital representation of an iris of an eye of at least one authentic user and a second digital representation of at least one authentic overlay pattern, where the iris of the user has been overlaid with a contact lens including a further overlay pattern thereby creating an image, in the third digital representation, comprising the iris of the user to be authenticated and the further overlay pattern, and wherein said attempting to authenticate the user comprises performing an initial comparison of the third digital representation with the expected digital representation;

in response to a determination, from said initial comparison, that the third digital representation and the expected digital representation do not match:
 modifying the expected digital representation to alter a relative rotational alignment between the representation of the at least one authentic overlay pattern and the expected digital representation of the iris of the at least one authentic user; and
 performing a further comparison between the modified expected digital representation and the third digital representation; and
 generating, based on the further comparison, an authentication signal indicative of whether authentication of the user has been successful.

9. The computer program product of claim 8, wherein the first digital representation and the second digital representation are obtained by retrieving the first and second digital representations from a data store.

10. The computer program product of claim 8, said method comprising:
 changing the at least one authentic overlay pattern on a periodic basis.

11. The computer program product of claim 8, wherein the third digital representation is obtained from an image capture device configured to capture the image of an iris of the user to be authenticated being overlaid with the further overlay pattern.

12. The computer program product of claim 11, wherein said obtaining the third digital representation comprises controlling the image capture device to capture the image of an iris of the user to be authenticated being overlaid with the further overlay pattern.

13. The computer program product of claim 8, wherein said modifying the expected digital representation comprises:
 determining a cross-correlation function between the third digital representation and the second digital representation;
 identifying one or more maxima of the cross-correlation function; and
 altering the relative rotational alignment by an amount dependent upon the positions of the one or more maxima within the second and/or third digital representations.

14. The computer program product of claim 8, said method further comprising:
 conveying the contact lens to the user to be authenticated by a secure distribution means.

15. A computer system, comprising a processor, a memory coupled to the processor, and a computer readable storage device coupled to the processor, said storage device containing program code executable by the processor via the memory to implement a method for authenticating a user, said method comprising:
 attempting to authenticate the user by comparing a third digital representation of a captured image of an iris of a user to be authenticated with an expected digital representation of the iris, wherein the expected digital representation of the iris is a combination of a first digital representation of an iris of an eye of at least one authentic user and a second digital representation of at least one authentic overlay pattern, where the iris of the user has been overlaid with a contact lens including a further overlay pattern thereby creating an image, in the third digital representation, comprising the iris of the user to be authenticated and the further overlay pattern, and wherein said attempting to authenticate the user comprises performing an initial comparison of the third digital representation with the expected digital representation;

in response to a determination, from said initial comparison, that the third digital representation and the expected digital representation do not match:

modifying the expected digital representation to alter a relative rotational alignment between the representation of the at least one authentic overlay pattern and the expected digital representation of the iris of the at least one authentic user; and performing a further comparison between the modified expected digital representation and the third digital representation; and generating, based on the further comparison, an authentication signal indicative of whether authentication of the user has been successful.

16. The computer system of claim 15, wherein the first digital representation and the second digital representation are obtained by retrieving the first and second digital representations from a data store.

17. The computer system of claim 15, said method comprising:

changing the at least one authentic overlay pattern on a periodic basis.

18. The computer system of claim 15, wherein the third digital representation is obtained from an image capture device configured to capture the image of an iris of the user to be authenticated being overlaid with the further overlay pattern.

19. The computer system of claim 18, wherein said obtaining the third digital representation comprises controlling the image capture device to capture the image of an iris of the user to be authenticated being overlaid with the further overlay pattern.

20. The computer system of claim 15, wherein said modifying the expected digital representation comprises:

determining a cross-correlation function between the third digital representation and the second digital representation;

identifying one or more maxima of the cross-correlation function; and altering the relative rotational alignment by an amount dependent upon the positions of the one or more maxima within the second and/or third digital representations.

* * * * *